United States Patent [19]

Shelby

[11] 3,964,866
[45] June 22, 1976

[54] HELIUM RECLAMATION

[76] Inventor: William Barney Shelby, 5 Rockbourne St., Elizabeth South, Australia, 5112

[22] Filed: Sept. 13, 1974

[21] Appl. No.: 505,551

[52] U.S. Cl. ............................ 23/252 R; 55/66; 55/387; 61/69 A; 128/142 R; 423/262
[51] Int. Cl.² .................. B01J 1/22; B01D 53/14; C01B 23/00
[58] Field of Search ............ 128/142, 145.8, 191 R, 128/188; 55/66, 387; 423/262; 23/252 R, 281; 61/69 R, 69 A

[56] References Cited
UNITED STATES PATENTS

| | | | |
|---|---|---|---|
| 3,524,444 | 8/1970 | Ellard et al. ...................... | 128/142 |
| 3,528,219 | 9/1970 | De Marco et al. .................. | 55/66 |
| 3,802,427 | 4/1974 | Banjavich et al. ................ | 128/142.3 |
| 3,859,994 | 1/1975 | Almquist et al. ................. | 128/142.3 |

Primary Examiner—Joseph Scovronek
Assistant Examiner—Barry I. Hollander
Attorney, Agent, or Firm—Jay L. Chaskin

[57] ABSTRACT

Means for reclamation of helium from diving apparatus comprise a bell conduit coupled to the discharge valve of a diving bell, a first receiver coupled to the conduit and arranged to receive gas from the bell, a second receiver coupled through a regulating valve to the first receiver, the regulating valve being arranged to close upon increase of pressure in the second receiver, a compressor and a storage tank (or bank of storage tanks), and further conduits interconnecting the second receiver, compressor and storage tanks for gas flow therebetween.

6 Claims, 1 Drawing Figure

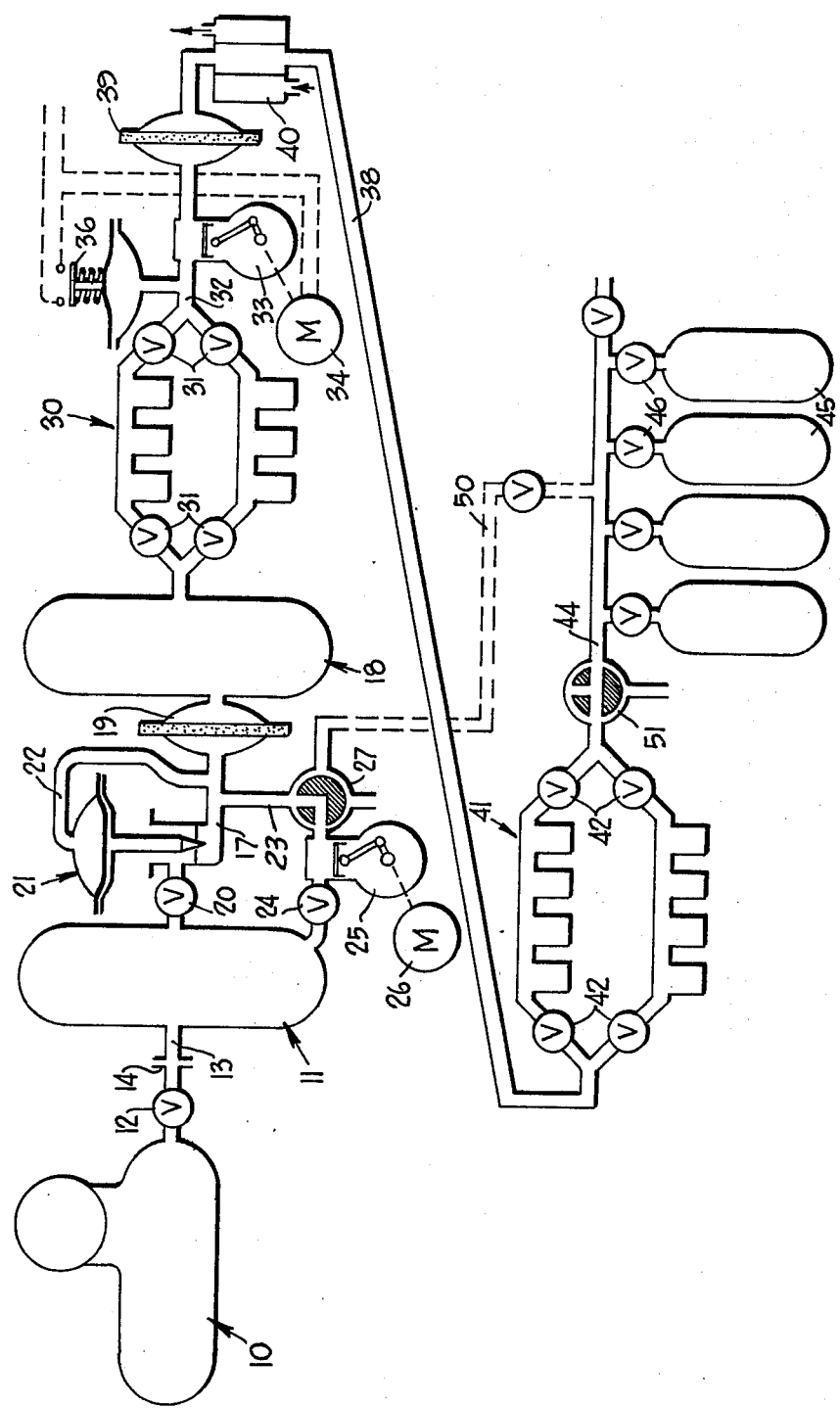

HELIUM RECLAMATION

This invention relates to a method and means for the reclamation of helium from diving apparatus.

BACKGROUND OF THE INVENTION

For deep diving it is usual to employ helium as the admixing gas with the oxygen required to be breathed by the divers. Helium is an inert gas and avoids the narcotic effect which can be obtained by breathing nitrogen under conditions of extreme pressure.

Helium however is a gas which is in very short supply and exceedingly costly. Heretofore helium which has been used in diving bells, for example, has been wasted, merely being vented to the atmosphere, and replaced by new helium supplies which themselves have originated from gas wells.

Many attempts have been made and much research has been undertaken in an effort to obtain a suitable substitute for helium, but at the time of making this invention no suitable substitute has been accepted generally as being useful for commercial diving and economical, and the main object of this invention is therefore to provide a means and method whereby helium from a diving bell can be reclaimed.

A further object of this invention is to provide a means and method whereby the reclamation can take place without interfering with normal operation of a diving bell.

BRIEF SUMMARY OF THE INVENTION

According to this invention, means for reclamation of helium from diving apparatus comprise a bell conduit coupled to the discharge valve of a diving bell, a first receiver coupled to the conduit and arranged to receive gas from the bell, a second receiver coupled through a regulating valve to the first receiver, the regulating valve being arranged to close upon increase of pressure in the second receiver, a compressor and a storage tank (or bank of storage tanks), and further conduits inteconnecting the second receiver, compressor and storage tanks for gas flow therebetween.

Further according to this invention a method of reclaiming helium from diving apparatus comprises connecting said means to the gas discharge valve on said apparatus, opening the valve to discharge gas from said apparatus into said first receiver, passing the gas through said regulator valve from the first and into said second receiver, the regulator valve maintaining the pressure in said second receiver at not more than two atmospheres, and operating the compressor to transfer the gas from the second receiver into said storage tank or tanks, but discontinuing said compressor operation when the pressure in the second receiver drops below a set valve, which said set valve is a subatmospheric pressure.

BRIEF DESCRIPTION OF THE DRAWINGS

An embodiment of the invention is described hereunder in some detail with reference to and is illustrated in the accompanying drawing, in which:

FIG. 1 is a diagrammatic layout of means for the reclamation of helium from diving apparatus.

According to this embodiment, means for reclamation of helium from a diving bell 10 comprise firstly a first receiver 11. The diving bell 10 is provided in the usual way with a conduit (termed an "umbilical cord") to regulating valve 12, and a conduit 13 is connected to the valve 12 by means of a coupling 14 of known type. The conduit 13 may itself contain a valve for isolating the receiver 11. Such a valve is not shown herein, but can be valuable if it is desired to limit nitrogen contamination of the system by preventing entry of air thereinto, when the coupling 14 is disconnected.

The output from receiver 11 is connected by conduit 17 into a second receiver 18 through a water trap 19, the conduit 17 containing a manually operable shut off valve 20 useful for closing the conduit 17 and thereby isolating the downstream portion of the system. The conduit 17 also contains a pressure operated diaphragm valve 21 connected to the second receiver 18 by a branch line 22, and adjusted to limit the pressure of the gas which enters the receiver 18, in this embodiment to not exceed two atmospheres. This avoids the need for receiver 18 to constitute a high pressure vessel, and protects the pump (described below) against overlaod conditions developing. The receiver 18 may, if desired, be a flexible wall bag.

A further conduit 23 is in parallel relation with conduit 17 to interconnect the first and second receivers, the further conduit 23 containing an isolating valve 24 which is manually operable, a vacuum pump 25 coupled to motor 26, and a two-way valve 27. The vacuum pump 25 may be any one of a number of commercially available pumps, one suitable pump being identified as an "Atlas-Copco KE40", and available from Atlas Copco Australia Pty. Limited, 3 Bessemer Street, Blacktown, New south Wales. The vacuum pump is shown in this embodment, but in many installations would not be used, since most of the helium can be saved without it.

The output of the second receiver 18 passes through two banks of carbon dioxide absorbers 30, each bank being provided with isolating valves 31 at each end so that one bank can be recharged with absorbent material as the other bank is being used. The absorbent material utilised is in accordance with known art, preferably soda lime, for example as sold by C.I.G. of Jervois Street, Torrensville, South Australia under the Trade Mark VIVALYME.

A conduit 32 extends from the $CO_2$ absorber banks 30 into the intake side of a compressor 33, the compressor 33 being driven by a motor 34. The compressor 33 again can be any one of a number of different types, one suitable compressor being an Atlas Copco BP3 which is a four stage compressor capable of being run at speeds between 750 r.p.m. and 1200 r.p.m. to give a free air delivery of 13.3 cubic feet per minute to 21.2 cubic feet per minute, and also being capable of delivering a pressure of 4250 psi, gauge. It should be noted that neither the vacuum pump 25 nor the compressor 33 should be lubricated with ordinary lubricants because of the possibility of introducing undesirable odours into the breathable gas, but lubricants which are suitable for the compressing of breathable gas are well known. One such lubricant which is commonly used is sold by Castrol Aust. Pty. Ltd., of Elder Road, Birkenhead, South Australia, under the Trade Mark PRIMOL D.

It is desirable to maintain the pressure within the second receiver 18 within a range, for example a range of between 14.5 psi and 25 psi (preferably between 14.5 psi and 15.5 psi) and this is achieved by the control valve 21, and also by switching compressor motor 34 on or off as the case may be. To effect motor control, the motor 34 is itself controlled by a pressure switch 36 which is responsive to the pressure immediately before the compressor 33, and if one pair of valves 31 is opened, then it is responsive to the pressure in the second receiver 18.

The output conduit 38 of the compressor 33 contains in it a further water filter 39, the water filters in this embodiment being of the ceramic type readily available to the trade. One supplier is Doulton Potteries Pty. Ltd., of 217 West Beach Road, Richmond, South Australia.

The conduit 38 leads through an after cooler 40 into a double bank 41 of contaminant absorbers, the double bank 41 being of similar configuration to the double bank 30, having a pair of valves 42 at each end of the bank, so that one bank can be isolated from the other for recharging. The double bank 41 contains activated charcoal which has a characteristic of removing contaminants from the gas, and is particularly useful for ensuring the removal of any carbon monoxide which may have inadvertently gained entry into the system. It also removes many of the undesired odours. A continuing conduit 44 extends to a bank of pressure cylinders 45 within which the gas is stored, each cylinder 45 having a valve 46 thereon.

The manner in which the device is used is as follows:

Assume that the bell operates at a depth of 1000 feet, and the bell is 6 feet in diameter its capacity would be 113 cubic feet approximately. The volume at the atmospheric pressure of the equivalent 445 psi is 3424 cubic feet of free breathable gas. It is necessary to continuously "vent" the bell at the rate of 4.5 cubic feet per minute per man, but since all gas is recovered, any venting rate above this may be used. It would probably be necessay for a "first stop" to be made at about 600 feet, and subsequent stops at intervals thereafter, probably for many hours, during which time venting continues. The volume of helium wasted by venting to atmosphere is very great, and the savings due to this invention are of considerable magnitude.

If the volume of the first receiver is about that of the bell, then the pressure of gas in the first receiver would be about 180 psi, less pressure drop due to operation of compressor 33 during initial decompression (which is probably more than seven minutes). Gas is inroduced from bell 10 into the first receiver 11 by control of the valve 12 connected to the bell. The valve is "cracked" to allow the required rate of gas to flow from the bell into the first receiver (which may have previously been evacuated by pump 25), and the gas is moved into the second receiver 18 and pumped from the second receiver into the storage tanks. The valve 12 is controlled to hold the bell at the required pressure and the compressor is rendered ineffective by pressure switch 36 after the receivers have been exhausted. After the required time has elapsed, the valve 12 of the bell is again opened and once again the pressure is reduced in accordance with the instructions contained within the diving tables. When the installation includes the vacuum pump 25, residual gas in receiver 11 is evacuated thereby, after the bell pressure has reached atmospheric pressure and valve 12 is closed.

It will be seen that the use of relatively large banks of storage tanks 45 enables the temperature to be retained relatively low.

The removal of unwanted contaminants and other gases from the helium and oxygen mixture complies with suitable standards. For example the standards set down by the United States Diving Manual, 1970 edition are acceptable throughout the world. Pages 481 to 502 of said Manual set out the requirements for gas analysis and the methods of purification which may be adopted.

The stored gas in tanks 45 may be sampled, and recycled through the contaminant absorbers if this is necessary, passing into a further bank of tanks (not shown). Conveniently a conduit 50 (shown dotted) can be connected between the bank 45 and a suitable port on valve 27 for this purpose, or alternatively to the intake of the pressure operated valve 21. The further bank of tanks would, in that case, be connected to the otherwise unused part of change over valve 51.

A consideration of the above invention will indicate that although apparently simple, it nevertheless incorporates the safety features which are essential to make it acceptable, it will be seen that it is easy to control in such a way that a diver is not liable to be subjected to health hazards, and further it will be seen that the equipment is so simple in its construction that it is suitable for use on site, for example on oil rigs which are erected in the sea. The embodment can of course be varied in many ways. Thus for example, each bank can contain some soda lime and some charcoal, instead of these absorbents being contained in separate banks, but these and other similar variations will be seen to lie within the invention.

While I have herein shown and described the preferred embodiment of this invention and have suggested variations therein, other changes and variations may be made therein within the scope of the appended claims without departing from the spirit and scope of this invention.

What I claim is:

1. An apparatus for reclaiming helium from an admixture of gas provided to a diving means having a diving bell with a discharge valve comprising
    a bell conduit having coupling means for connection to the discharge valve;
    a first means coupled to the bell conduit for receiving the gas passed therethrough;
    a second means coupled to the first receiver by an interconnecting conduit for receiving the gas passed therethrough;
    a regulating valve means in the inteconnecting conduit for closing upon increase of pressure of the gas in the second receiver means;
    compressor means coupled downstream of and to the second receiver means for increasing the gas pressure to a storage pressure;
    storage means coupled downstream of and to the compressor means for receiving the pressurized gas and
    means for removing contaminants in the discharged gas between the diving bell and the storage means.

2. Apparatus according to claim 1 wherein the means for removing contaminants comprises banks of contaminant absorbers arranged in two pairs, one pair containing soda lime for the absorption of carbon dioxide and one pair for the absorption of carbon monoxide and odours.

3. Apparatus according to claim 1 wherein the means for removing contaminants comprises banks of contaminant absorbers, each bank having an isolating valve at each end so that one bank of a pair of banks may be recharged as the other is being used.

4. Apparatus according to claim 1 further comprising a plurality of water filter means for trapping water from the discharged gas.

5. Apparatus according to claim 1 further comprising a vacuum pump between the first and second receiver means operable to evacuate gaseous contents from the first receiver means and transfer them to the second receiver means.

6. Apparatus according to claim 1 further comprising a pressure responsive means coupled to the intake of the compressor means, a motor for driving the compressor, the pressure responsive means being arranged to de-energise said motor upon fall of pressure to a set value.

* * * * *